United States Patent
Beck et al.

(10) Patent No.: US 7,690,317 B2
(45) Date of Patent: Apr. 6, 2010

(54) COMPUTER WORKSTATION WITH MOVEABLE MONITOR SUPPORT

(75) Inventors: Robert L. Beck, Zeeland, MI (US); Joel R. Dral, Zeeland, MI (US); John C. Groelsma, Jenison, MI (US); Jeffrey A. Weber, Golden Valley, MN (US)

(73) Assignee: Herman Miller, Inc., Zeeland, MI (US)

( * ) Notice: Subject to any disclaimer, the term of this patent is extended or adjusted under 35 U.S.C. 154(b) by 1113 days.

(21) Appl. No.: 10/797,581

(22) Filed: Mar. 10, 2004

(65) Prior Publication Data

US 2004/0256524 A1 Dec. 23, 2004

Related U.S. Application Data

(60) Provisional application No. 60/455,784, filed on Mar. 19, 2003.

(51) Int. Cl.
*A47B 11/00* (2006.01)

(52) U.S. Cl. .............. 108/143; 108/137; 108/50.11; 108/50.01; 108/20.7; 312/223.3; 312/331; 312/319.8; 312/319.5; 312/319.6; 312/319.7; 248/128; 248/424

(58) Field of Classification Search ............ 248/146, 248/127, 161, 157, 125.1, 125.8, 917, 918, 248/419, 424, 429, 430, 178.1, 183.4; 108/20, 108/7, 50.11, 50.01, 137, 143, 102; 312/319.5–319.8, 312/331, 223.3

See application file for complete search history.

(56) References Cited

U.S. PATENT DOCUMENTS

| | | | |
|---|---|---|---|
| 3,840,221 A | 10/1974 | Hogan | |
| 4,313,112 A | 1/1982 | Foster | |
| 4,365,561 A * | 12/1982 | Tellier et al. | 108/7 |
| 4,482,063 A | 11/1984 | Berke et al. | |
| 4,493,267 A | 1/1985 | Jedziniak | 108/50 |
| 4,511,111 A | 4/1985 | Godfrey et al. | |
| 4,515,086 A | 5/1985 | Kwiecinski et al. | |

(Continued)

FOREIGN PATENT DOCUMENTS

DE 4009536 9/1991

(Continued)

OTHER PUBLICATIONS

Office Action in U.S. Appl. No. 11/339,988 for Computer Workstation With Moveable Monitor Support, mailing date May 27, 2009, 8 pages.

*Primary Examiner*—J. Allen Shriver
*Assistant Examiner*—Todd M. Epps
(74) *Attorney, Agent, or Firm*—Brinks Hofer Gilson & Lione

(57) ABSTRACT

A computer workstation includes a worksurface moveable a first distance between first and second worksurface positions and a monitor support coupled to the worksurface. At least one of the worksurface and the monitor support is automatically moveable in response to a movement of the other of the worksurface and the monitor support. The monitor support is moveable a second distance between first and second monitor positions as the worksurface is moved the first distance between the first and second worksurface positions, wherein the second distance is greater than the first distance. A method of adjusting the position of a monitor support on a computer workstation is also provided.

22 Claims, 10 Drawing Sheets

U.S. PATENT DOCUMENTS

| | | | |
|---|---|---|---|
| 4,566,741 A | | 1/1986 | Eriksson et al. |
| 4,669,789 A | * | 6/1987 | Pemberton ............... 312/223.3 |
| 4,706,920 A | * | 11/1987 | Ojima et al. ................. 248/371 |
| 4,714,025 A | | 12/1987 | Wallin et al. .................. 108/20 |
| 4,717,112 A | | 1/1988 | Pirkle |
| 4,779,922 A | | 10/1988 | Cooper ....................... 297/188 |
| 4,805,538 A | | 2/1989 | Fisher et al. .................... 108/7 |
| 4,828,342 A | * | 5/1989 | Stefan ..................... 312/223.3 |
| 4,880,270 A | | 11/1989 | Cooper ....................... 297/188 |
| 4,890,561 A | | 1/1990 | Hampshire et al. |
| 4,915,450 A | | 4/1990 | Cooper ....................... 297/423 |
| 4,981,085 A | | 1/1991 | Watt ............................ 108/147 |
| 5,044,284 A | * | 9/1991 | Gross ........................... 108/10 |
| 5,056,864 A | | 10/1991 | Cooper ....................... 297/188 |
| 5,172,641 A | | 12/1992 | Auer |
| 5,183,230 A | | 2/1993 | Walker et al. |
| 5,199,773 A | * | 4/1993 | Price et al. ................... 312/7.2 |
| 5,263,668 A | | 11/1993 | Reiter |
| 5,287,815 A | | 2/1994 | Gross |
| 5,322,026 A | | 6/1994 | Bay ............................ 110/235 |
| 5,339,750 A | | 8/1994 | Smies ......................... 108/147 |
| 5,398,622 A | * | 3/1995 | Lubinskas et al. ........... 108/145 |
| 5,408,940 A | * | 4/1995 | Winchell .................... 108/147 |
| 5,419,525 A | | 5/1995 | Hilton |
| 5,424,912 A | | 6/1995 | Mikan |
| 5,437,235 A | | 8/1995 | Randolph |
| 5,443,017 A | | 8/1995 | Wacker et al. |
| 5,450,800 A | * | 9/1995 | Leonard ......................... 108/7 |
| 5,490,466 A | | 2/1996 | Diffrient |
| 5,522,323 A | | 6/1996 | Richard |
| 5,623,881 A | | 4/1997 | Huang |
| 5,671,091 A | | 9/1997 | Monroe |
| 5,680,820 A | * | 10/1997 | Randolph .................... 108/25 |
| 5,712,761 A | | 1/1998 | Dials et al. |
| 5,765,910 A | | 6/1998 | Larkin et al. ................. 297/217 |
| 5,845,586 A | | 12/1998 | Moore |
| 5,857,415 A | | 1/1999 | Richard |
| 5,909,934 A | | 6/1999 | McGraw |
| 5,967,631 A | | 10/1999 | Ko |
| 5,992,810 A | | 11/1999 | Crinion et al. |
| 6,076,473 A | | 6/2000 | Conte |
| 6,092,868 A | | 7/2000 | Wynn ......................... 297/146 |
| 6,119,605 A | | 9/2000 | Agee ........................... 108/147 |
| 6,135,032 A | | 10/2000 | Ko |
| 6,269,753 B1 | | 8/2001 | Roddan |
| 6,270,157 B1 | | 8/2001 | Kapushinski ................ 297/170 |
| 6,296,408 B1 | | 10/2001 | Larkin et al. ................. 400/682 |
| 6,315,358 B1 | | 11/2001 | Baru ........................... 297/170 |
| 6,374,752 B1 | | 4/2002 | Walser |
| 6,382,745 B1 | | 5/2002 | Adkins |
| 6,394,402 B2 | | 5/2002 | Coonan et al. |
| 6,398,326 B1 | | 6/2002 | Wang |
| 6,439,657 B1 | | 8/2002 | Tholkes |
| 6,446,564 B1 | | 9/2002 | Anderson |
| 6,471,164 B2 | | 10/2002 | DiOrio |
| 6,474,760 B2 | | 11/2002 | Rauls |
| 6,484,648 B1 | | 11/2002 | Long ........................... 108/147 |
| 6,536,356 B2 | | 3/2003 | Krieger et al. |
| 6,568,650 B2 | | 5/2003 | Helmetsie et al. |
| 6,615,428 B1 | * | 9/2003 | Pattee ............................. 5/601 |
| 6,615,429 B2 | | 9/2003 | Weil et al. |
| 6,691,626 B2 | | 2/2004 | Warner |
| 6,736,469 B2 | * | 5/2004 | Long ....................... 312/223.3 |
| 6,745,986 B1 | | 6/2004 | Bright |
| 6,799,816 B2 | | 10/2004 | Touzani |
| 6,874,431 B1 | | 4/2005 | Danna ......................... 108/143 |
| 7,032,523 B2 | | 4/2006 | Forslund, III et al. |
| 7,047,890 B2 | | 5/2006 | Korber et al. |
| 7,127,962 B2 | | 10/2006 | Angeles et al. |
| 7,322,653 B2 | | 1/2008 | Dragusin |
| 2002/0020329 A1 | | 2/2002 | Kowalski |
| 2002/0056797 A1 | | 5/2002 | Solomon et al. |
| 2004/0256524 A1 | | 12/2004 | Beck et al. .................. 248/146 |
| 2004/0262485 A1 | | 12/2004 | Marceau et al. |
| 2005/0285004 A1 | | 12/2005 | Elgie et al. |
| 2006/0174807 A1 | | 8/2006 | Dral et al. |

FOREIGN PATENT DOCUMENTS

| | | |
|---|---|---|
| DE | 42 00 965 | 7/1992 |
| EP | 592181 | 4/1994 |

* cited by examiner

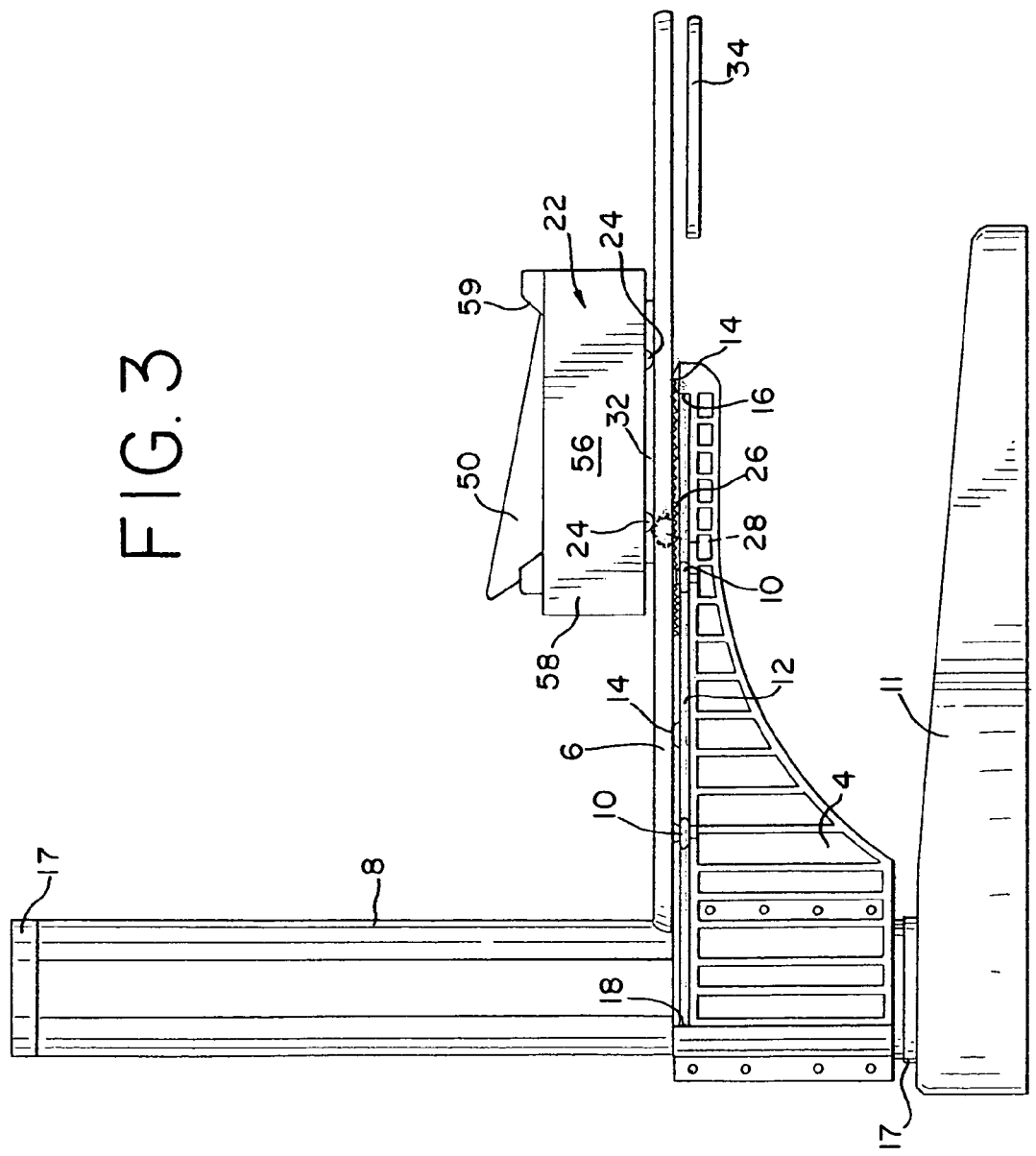

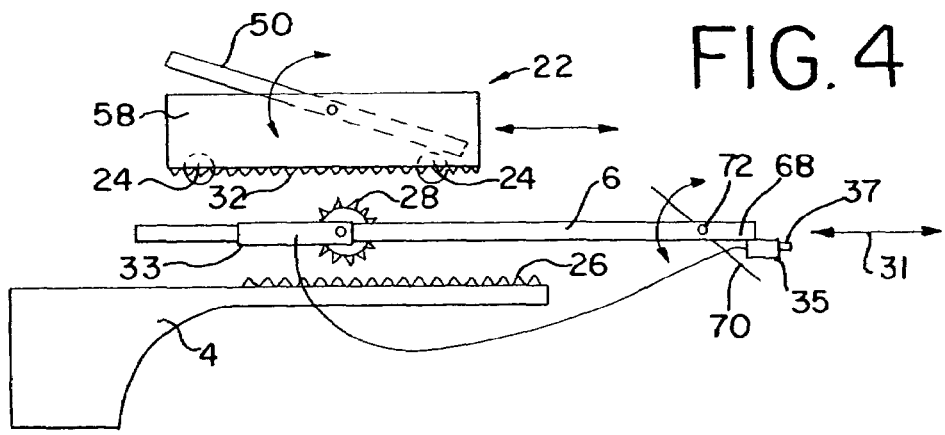
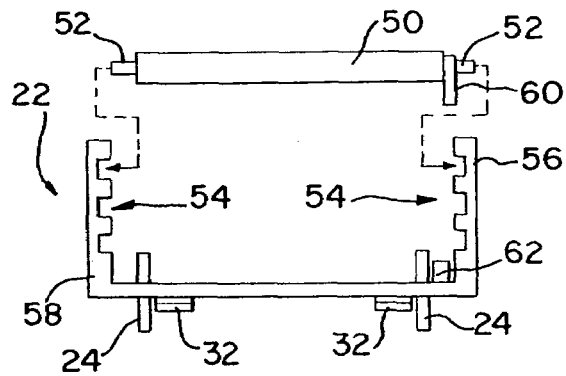
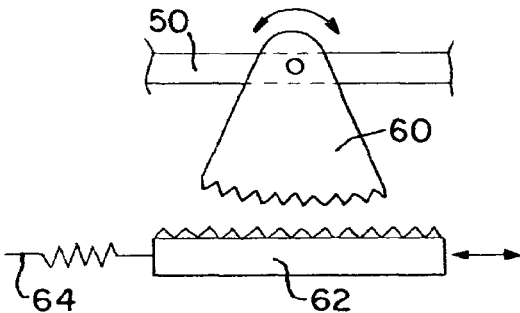
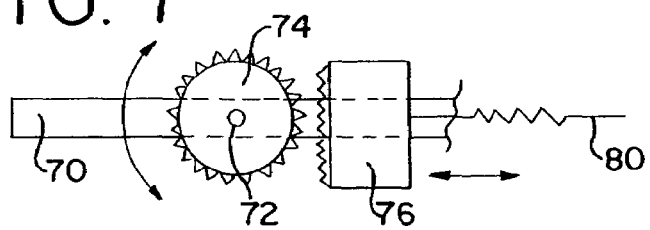
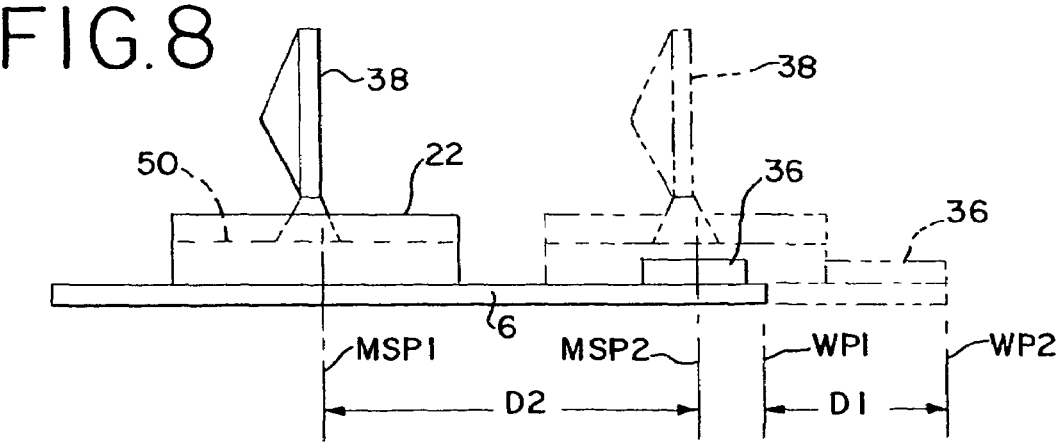

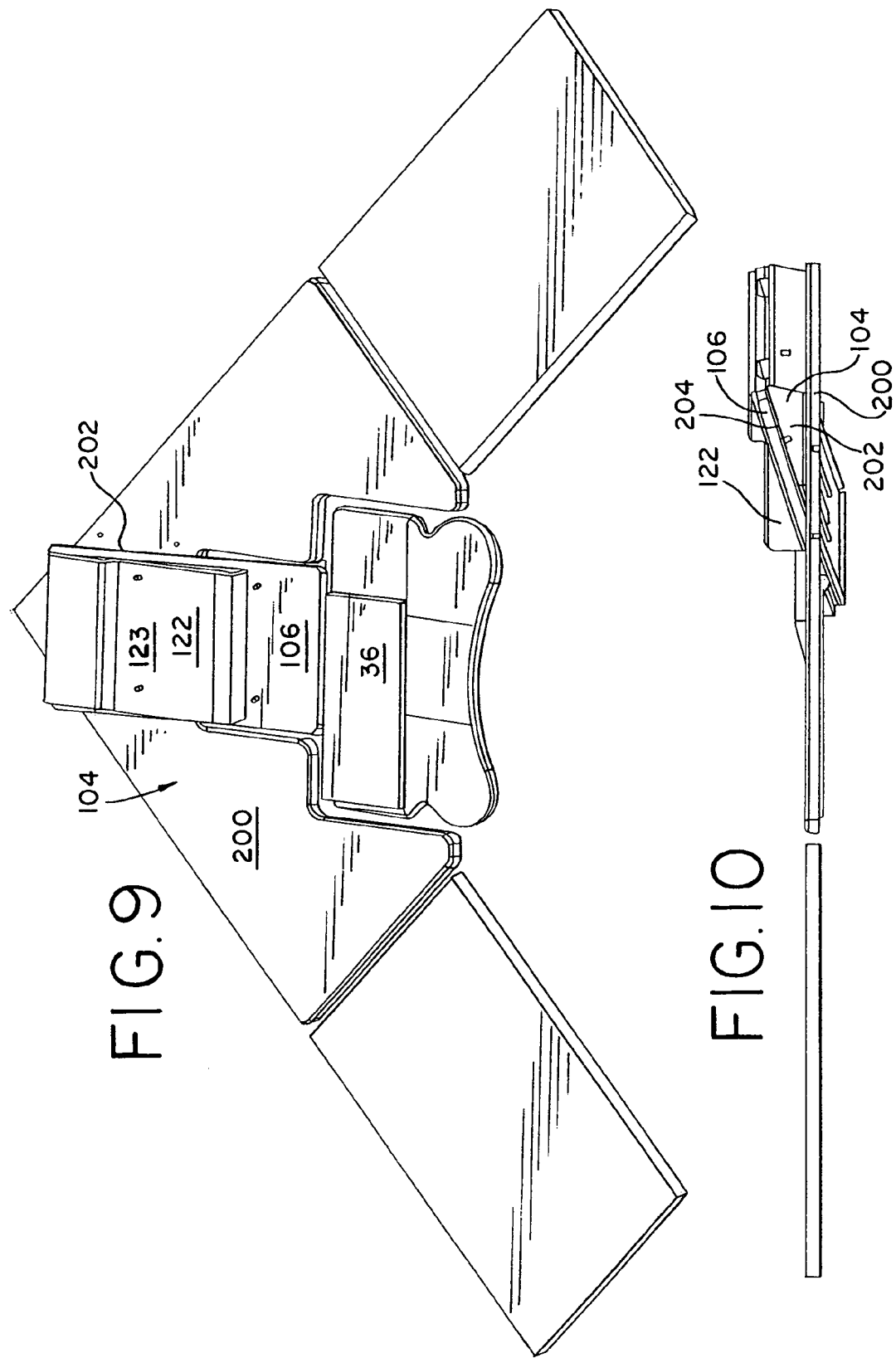

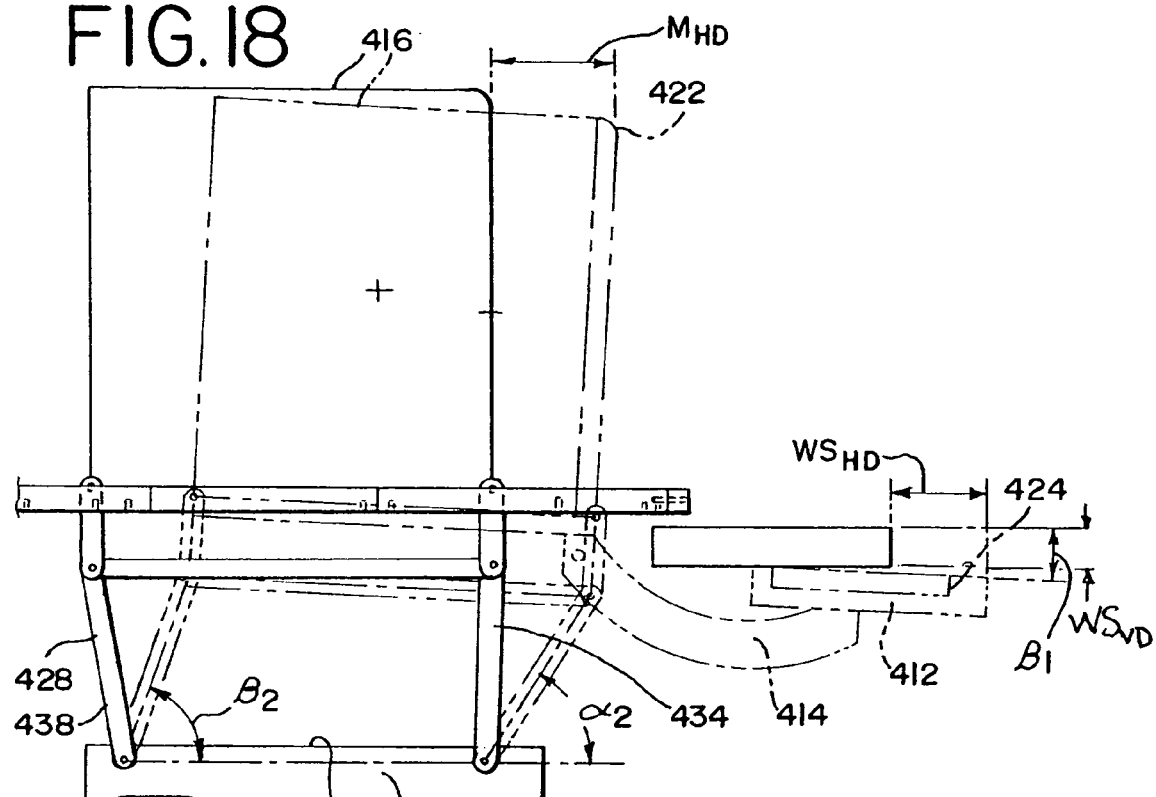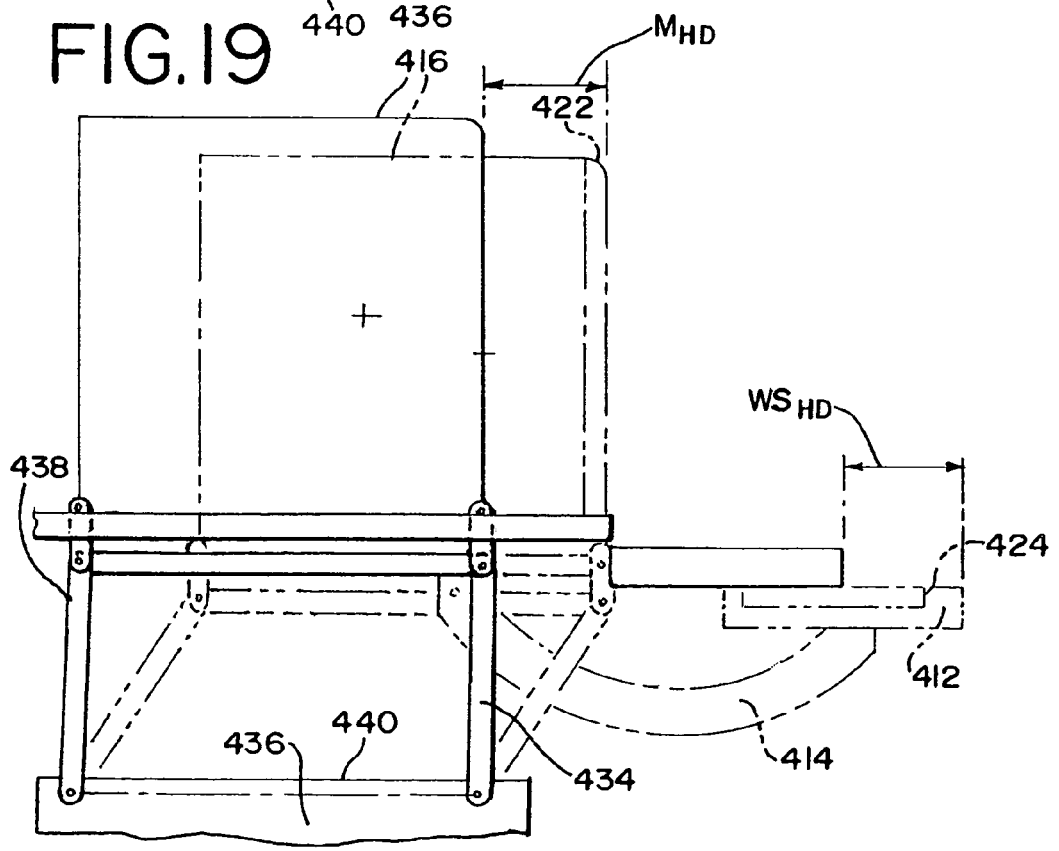

COMPUTER WORKSTATION WITH MOVEABLE MONITOR SUPPORT

This application claims the benefit of U.S. Provisional Application Ser. No. 60/455,784, filed Mar. 19, 2003, the entire disclosure of which is hereby incorporated herein by reference.

BACKGROUND

The present invention relates generally to a computer workstation, and in particular, to a computer workstation having a moveable monitor support.

Workstations can be configured with a monitor support that is moveably supported by a worksurface, as shown for example in U.S. Pat. No. 4,515,086 to Kweicinski et al. and U.S. patent application Publication US 2002/0020329 to Kowalski. In such workstations, the user can adjust the position of the monitor to accommodate their particular needs, for example if they are reclining in a chair. Other workstations are configured with a moveable worksurface, as shown for example in U.S. Pat. No. 5,172,641 to Auer. Again, the user can adjust the position of the worksurface to accommodate their particular needs. As shown in U.S. Pat. No. 4,717,112, some workstations can be configured with multiple support members that are moveable relative to each other.

In many instances, the user of such workstations is seated at the workstation in a tiltable chair. Typically, as the user tilts rearwardly, the position of the eyes of the user travels rearwardly at a greater rate and to a greater distance relative to a monitor positioned at the workstation than does the position of the hands of the user located at a keyboard positioned on the workstation. Accordingly, the user is typically required to independently readjust one or both of the worksurfaces, if moveable, and the monitor support, if moveable, when reclining to different positions to maintain an optimum position of each relative to the user, and in particular to the eyes and hands of the user.

BRIEF SUMMARY

Briefly stated, in one aspect, one embodiment of a computer workstation includes a worksurface moveable a first distance between first and second worksurface positions and a monitor support coupled to the worksurface. At least one of the worksurface and the monitor support is automatically moveable in response to a movement of the other of the worksurface and the monitor support. The monitor support is moveable a second distance between first and second monitor positions as the worksurface is moved the first distance between the first and second worksurface positions, wherein the second distance is greater than the first distance.

In an exemplary embodiment, the second distance is between about 1.5 and 3.0 times the first distance. In one preferred embodiment, the second distance is about 2.0 times the first distance.

In another embodiment, a computer workstation includes a base having a first rack, a worksurface moveably supported by the base and having a pinion gear rotatably mounted thereto, and a monitor support moveably supported by the worksurface and having a second rack. The pinion gear is disposed between and engages the first and second racks.

In another embodiment, the worksurface is connected to a first drive device and the monitor support is connected to a second drive device. The monitor support and the worksurface are coupled with a controller, which is operably connected to the first and second drive devices. The controller automatically and simultaneously actuates the drive devices to move the worksurface and monitor support.

In another embodiment, the worksurface is connected to the monitor support. The monitor support rotates about a horizontal axis, such that the worksurface moves a lesser distance than the monitor support relative to the user.

In another aspect, a computer workstation includes a base structure and a monitor support rotatably and translatably coupled to the base structure. The monitor support is translatable between first and second positions, wherein the monitor support rotates about a horizontal axis as the monitor support is translated between the first and second positions. A worksurface is connected to the monitor support and is rotatable with the monitor support about the horizontal axis as the monitor support is translated between the first and second positions.

In another aspect, a method of adjusting the position of a monitor support on a computer workstation includes moving a worksurface a first distance between first and second worksurface positions, and automatically moving a monitor support a second distance between first and second monitor positions in response to moving the worksurface the first distance between the first and second worksurface positions. The second distance is greater than the first distance.

The various aspects and embodiments provide significant advantages over other workstations. For example and without limitation, movement of either of the monitor support or worksurface causes the other thereof to move, with the monitor support moving a greater distance than the worksurface. In this way, the monitor support is maintained substantially the same distance from the eyes of the user as the user tilts rearwardly in the chair and adjusts the position of the worksurface to accommodate the position of the hands of the user.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF SEVERAL VIEWS OF THE DRAWINGS

FIG. 3 is a partial side view of the workstation.

FIG. 4 is an exploded, schematic side view of the workstation.

FIG. 5 is an exploded, schematic front view of a monitor support.

FIG. 6 is a partial, exploded schematic view of monitor support adjustment device.

FIG. 7 is a partial, schematic view of a keyboard support adjustment device.

FIG. 8 is a partial schematic of the workstation being moved between a first and second position.

FIG. 9 is a top perspective view of an alternative embodiment of a partial workstation.

FIG. 10 is as rear perspective view of the workstation shown in FIG. 9.

FIG. 18 is a side view of an alternative embodiment of a workstation showing the monitor, monitor support and worksurface in first and second positions.

FIG. 19 is a side view of an alternative embodiment of a workstation showing the monitor, monitor support and worksurface in first and second positions.

DETAILED DESCRIPTION OF THE PRESENTLY PREFERRED EMBODIMENTS

Figure 1:
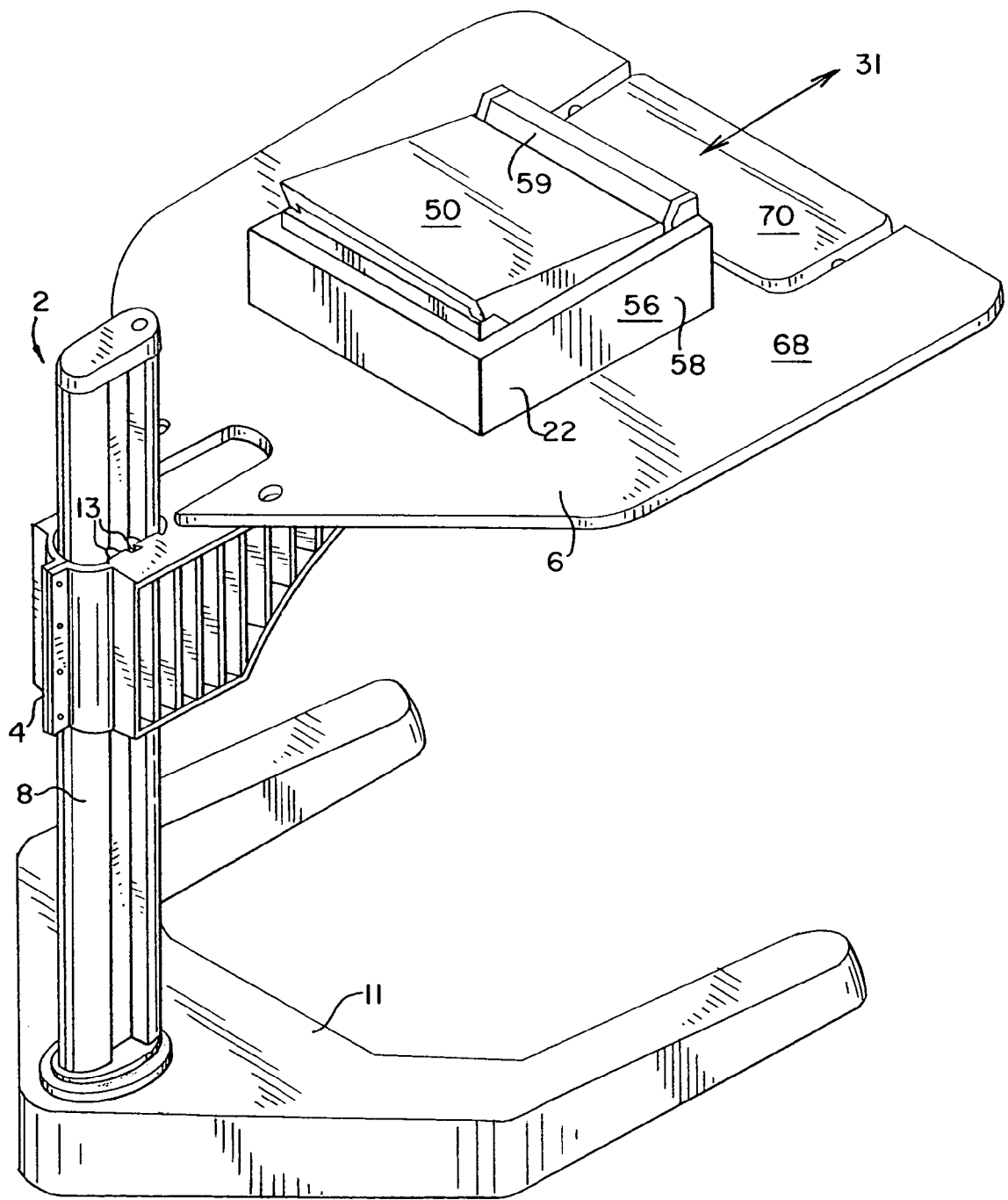
FIG. 1 is a top perspective view of a workstation.
Figure 2:
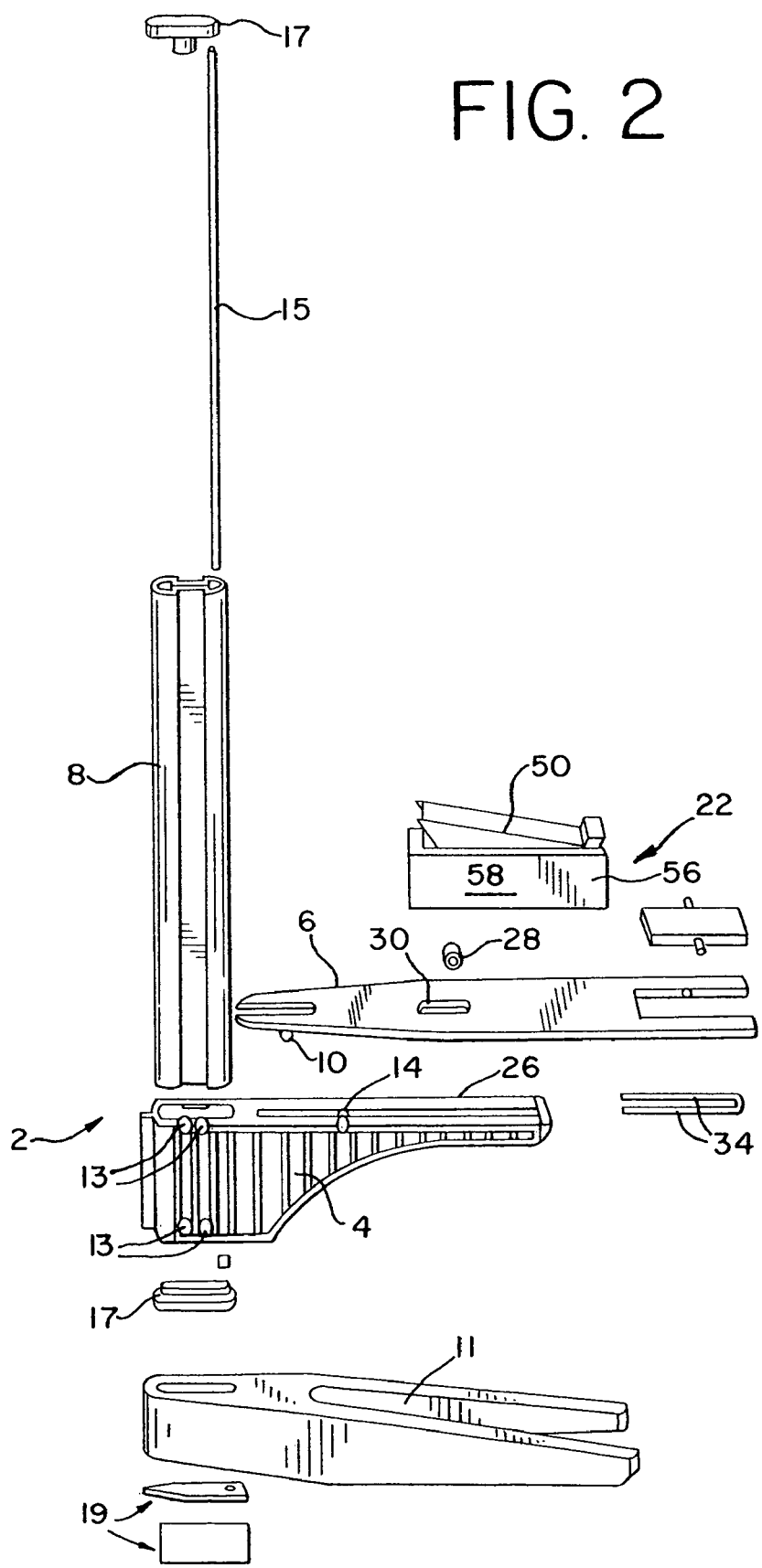
FIG. 2 is an exploded side perspective view of the workstation.

Referring to FIGS. 1-4, a first embodiment of the workstation 2 includes a base 4 and a worksurface 6 moveably supported on the base 4. The base 4 can be made as a stand-alone support, or it can be situated on an existing, fixed worksurface, such as a desktop. In one preferred embodiment, the base 4 is moveably supported on an upright 8 with a plurality of rollers, such that the base can be moved vertically to a desired position. The upright 8 is connected to a foot support 11 and is secured thereto with a pair of caps 17, a plate assembly 19 and a lead screw 15. It should be understood that the term "worksurface," as used herein, means any surface capable of supporting an object, e.g., a keyboard, a mouse, a document holder, papers, etc., and includes for example and without limitations monitor supports, desktops and keyboard trays.

A worksurface 6 includes a plurality of guide rollers 10 that engage tracks 12 formed on the base 4. It should be understood that the guide rollers 110 can be mounted on the base 104 and engage tracks 112 formed on the worksurface, as shown for example in FIG. 11. In either embodiment, the guide rollers 10, 110 limit the movement of the worksurface 6, 106 relative to the base 4, 104 to a generally fore-aft direction, thereby preventing the worksurface from rotating about a vertical axis and/or from moving in the lateral direction. It should be understood that the directions "fore" and "aft" refer to the position of the various components relative to the user, with "fore" being proximate or toward the user and "aft" being distal or away from the user. The term "lateral" means side-to-side. The guide rollers 10 can further limit the fore-and-aft movement of the worksurface 6, as the rollers 10 engage respectively the front and rear ends 16, 18 of the track 12, as shown in FIG. 3.

Referring to FIGS. 1-4, the worksurface 6 is further supported on a plurality of support rollers 14 that are rotatably mounted to the base 4. Again, it should be understood that the support rollers can alternatively be rotatably mounted on the worksurface and engage the base, or can be done away with altogether as the guide rollers support the worksurface on the base. The support rollers 14 carry and transfer the vertical load from the worksurface 6 to the base 4 as the worksurface moves in the fore-and-aft direction. In another embodiment (not shown), the worksurface is slidably coupled to and supported by the base, for example with a slide/guide device.

Referring to FIGS. 1-4 and 12, a monitor support 22, 122 is moveably supported on the worksurface 6, 106. In one embodiment, the monitor support 22 is configured with a plurality of wheels or support rollers 24, which roll and are supported on the moveable worksurface 6. In an alternative embodiment, the support rollers are mounted on the worksurface and support the monitor support, or are omitted altogether, e.g., when one or more pinion gears carries the load of the monitor support. In other embodiments, the monitor support is slidably connected to the worksurface, allowing the monitor support to slide relative thereto.

Referring to FIGS. 1-4 and 12, the monitor support 22, 122 is coupled to the worksurface 6, 106, such that movement of either of the worksurface or monitor support automatically moves the other thereof. The term "coupled" generally means connected to or engaged with whether directly or indirectly, for example with an intervening member, and does not require the engagement to be fixed or permanent, although it may be fixed or permanent, and includes both mechanical and electrical connection. In one embodiment, the base 4, 104 is configured with one or more gears 26, 126 (shown as two in one embodiment). In one embodiment, the gears 26, 126 are formed as linear gears or racks that extend in the fore-and-aft direction. It should be understood that in other embodiments, the gears on the base can be configured as rotary gears or non-linear gears.

The monitor support 22, 122 is configured with one or more gears 32, 132 mounted to the bottom thereof. In one embodiment, the gears 32, 132 are formed as linear gears or racks that extend in the fore-aft direction and face the gears disposed on the base. It should be understood that in other embodiments, the gears on the base and monitor support can be configured as rotary gears or non-linear gears. One or more pinion gears 28, 128 are rotatably mounted in one or more openings 30 formed in the worksurface 6, 106. The pinion gears 28, 128 are disposed between and are engaged with the gears 26, 126, 32, 132. In this embodiment, the engagement between the gears 32, 132 and the pinion gears 28, 128 couples the monitor support 22, 122 to the worksurface 6, 106, which is coupled to the base 4, 104. In this embodiment, therefore, the monitor support is also coupled to the base by way of the worksurface. The linear gears 26, 126, 32, 132 can be formed integrally on the base 4, 104 and monitor support 22, 122 respectively, or can be made as separate components mounted thereto.

In operation, the user, who is preferably seated, pulls or pushes the moveable worksurface 6, 106 in a fore-aft direction 31 toward or away from them respectively. In one embodiment, the worksurface 6 is provided with a handle or other grippable element 34 to facilitate the movement of the worksurface.

In another embodiment, shown in FIG. 4, a motor 33 is connected to the pinion gear, e.g., by way of a drive shaft. The motor is electrically connected to a controller 35, such as a switch, which can be actuated by the user. The controller can also be configured as a programmable controller or a computer, which can be programmed to automatically move the motor based on certain parameters. In this way, the controller can be programmed to accommodate the particular needs of an individual user, and can have for example several preset options that can be selected by the user. The controller can also include and be configured with an actuator 37, such as one or more push buttons, toggle switches, joy sticks or other known devices, to allow the user to actuate the motor 33 and turn the motor 33 in either direction so as to effect a forward or rearward movement of the worksurface 6 and monitor support 22. In one embodiment, the worksurface and monitor support can be both manually adjusted and adjusted by way of the controller.

In one anticipated use, a user is positioned in front of the workstation 2 in a tiltable chair. Referring to FIGS. 4 and 8, as the user tilts rearwardly in the chair, the user pulls the moveable worksurface 6 toward them a first distance (D1) in a first direction from a first worksurface position (WP1) to a second worksurface position (WP2), such that a keyboard 36 positioned thereon is maintained in the same location relative to the hands of the user. As the worksurface 6 is pulled toward the user in the first direction, the rack(s) 26 on the base 4 engage and rotate the pinion gear(s) 28 rotatably mounted on the worksurface 6. The pinion gear(s) 28 in turn engage the linear rack(s) 32 on the monitor support 22 and moves the monitor support a second distance (D2) relative to the worksurface in the first direction from a first monitor support position (MSP1) to a second monitor support position (MPS2).

As a result, the monitor support 22, and a monitor supported thereon, moves in the first direction toward the user at a greater rate than the moveable worksurface 6. In particular, the second distance (D2) moved by the monitor support 22 is greater than the first distance (D1) moved by the worksurface 6. It should be understood that other gear arrangements and configurations can be disposed between and couple the monitor support and worksurface (and/or base) to effect relative movements thereof. In one embodiment, the monitor support 22 moves toward or away from the user at a ratio of between about 1.5:1 and 3:1 relative to the moveable worksurface, and preferably at a ratio of about 2:1. In essence, the monitor support 22 moves toward and away from a user at a greater rate and distance than the worksurface 6. This differential movement maintains the proper position of a monitor 38 situated on the monitor support 22 and a keyboard 36 situated on the moveable worksurface relative to the eyes and hands of the user respectively as the user tilts rearwardly in a chair. The operation of the workstation shown in FIGS. 9-11 works in the same manner.

It should be understood that the monitor support can also be grasped and moved, which effects an automatic movement of the worksurface. As used herein, the reference to automatically moving the monitor support in response to moving the worksurface simply means that the worksurface and monitor support are coupled to automatically move relative to each other, regardless of which member is actually acted upon by the user or drive device, and includes without limitation the situation where the monitor support is acted upon by the user, the situation where the worksurface is acted upon by the user, and the situation where one or both of the worksurface and monitor support are acted upon by one or more drive devices.

Figure 13:
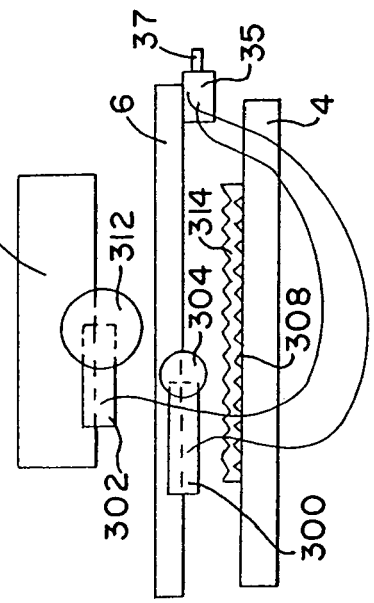
FIG. 13 is a schematic view of an alternative embodiment of a workstation.
Figure 12:
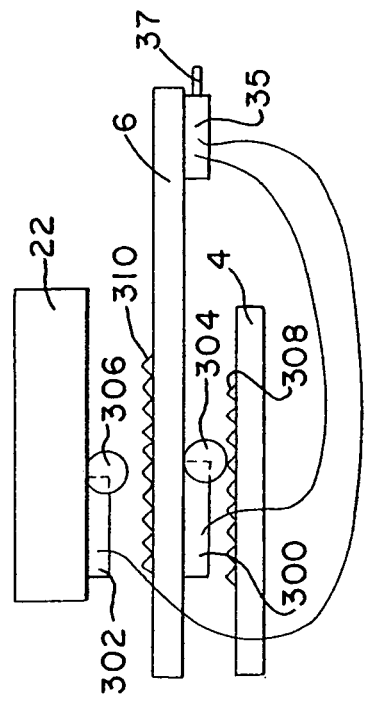
FIG. 12 is a schematic view of an alternative embodiment of a workstation.

Referring to FIGS. 12 and 13, another embodiment of the workstation includes a first drive device 302, shown as a motor, coupled to a first gear 306, 312 on the monitor support 22 and a second drive device 300, also shown as a motor, coupled to a second gear 304 on the worksurface 6. In both embodiments, the second gear 304 engages a rack 308 on the base. In the embodiment of FIG. 12, the first gear 306 engages a gear 310, configured as a linear rack, formed on the worksurface 6, while in the embodiment of FIG. 13, the first gear 312 engages a gear 314, configured as a linear rack, formed on the base 4. Also in the embodiment of FIG. 13, the monitor support 22 is supported on the base 4, rather than on the worksurface. In both embodiments, the monitor support 22 is coupled to the worksurface 6 by way of the motors 300, 302 being electrically coupled to a controller 35. In one embodiment, the controller is mounted to the worksurface. It should be understood, however, that the controller can be mounted to any portion of the workstation, including the base.

The controller 35 can be configured as a simple switch, which can be actuated by the user, or as a programmable controller, e.g., a programmable logic controller or computer, which can be programmed to automatically move the first and second motors 302, 300 based on certain parameters. In this way, the controller can be programmed to accommodate the particular needs of an individual user, and can have for example several preset options that can be selected by the user. The controller 35 also can include and be configured with an actuator 37, such as one or more push buttons, toggle switches, joy sticks or other known devices, to allow the user to actuate the motors 302, 300 and turn the motors in either direction so as to effect a forward or rearward movement of one or both of the worksurface and monitor support.

As set forth above, in the embodiments of FIGS. 12 and 13, the monitor support 22 and worksurface 6 are electrically coupled by way of the controller 35. In this way, the controller can be programmed to move the worksurface a first distance as the monitor support is moved a second distance. The relative movement of the worksurface to the monitor support can be controlled and varied for example and without limitation, by varying the speed and gear ratios of the motors 300, 302 and gears 304, 306, 308, 310, 312, 314 respectively. As such, the movement ratio or differential is not fixed, for example at 2:1, but can be readily varied by the manufacture or end user to accommodate the individual needs of the user, while still effecting an automatic movement of the worksurface and monitor support relative to each other.

In the embodiment of FIG. 12, the monitor support 22 is supported by and moves with the worksurface 6, such that the first motor 302 need move the monitor support only a small amount to achieve a movement differential between the worksurface and monitor support. It should be understood that other configurations and combinations of gears, motors and/or controllers can be used to couple and control the movement of the worksurface and the monitor support.

Figure 14:
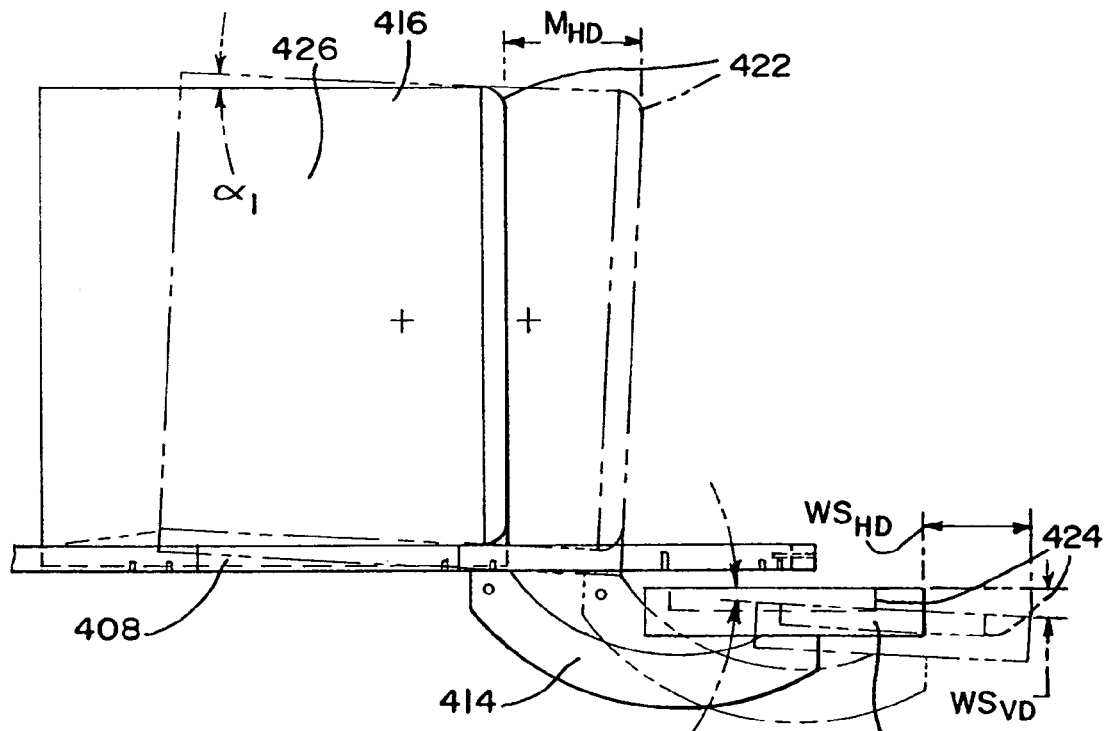
FIG. 14 is a side view of alternative embodiment of a workstation showing the monitor, monitor support and worksurface in first and second positions.
Figure 15:
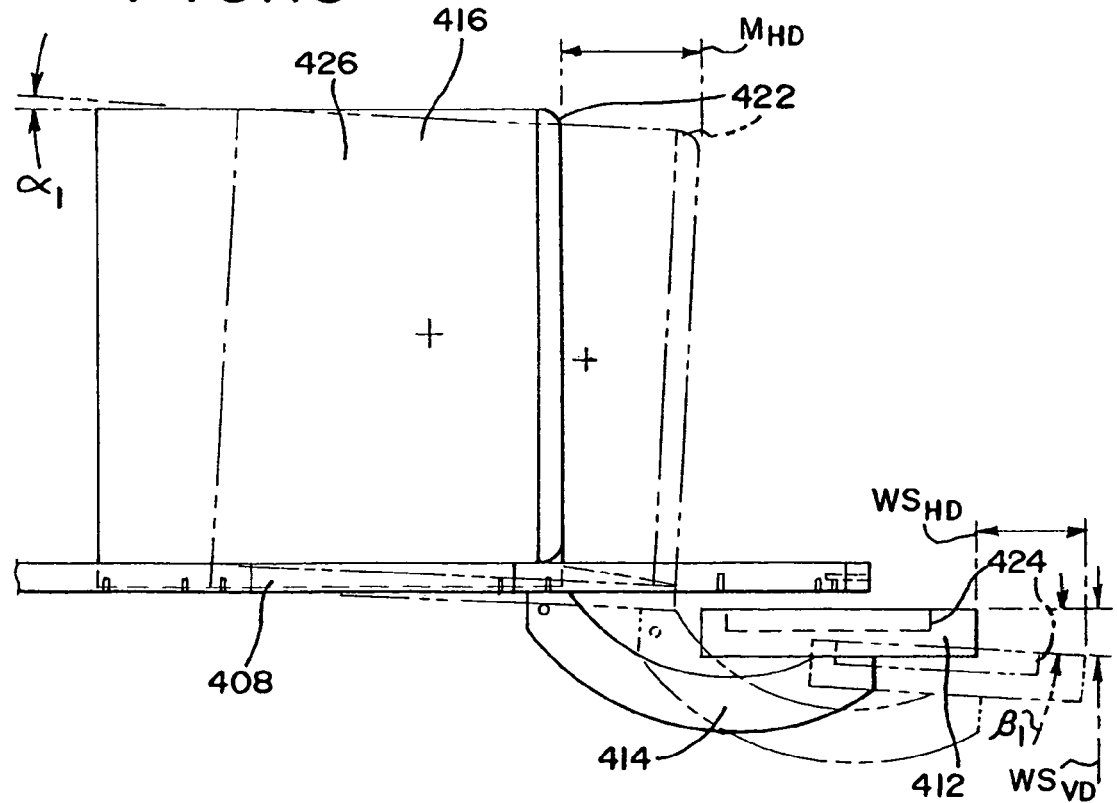
FIG. 15 is a side view of alternative embodiment of a workstation showing the monitor, monitor support and worksurface in first and second positions.
Figure 16:
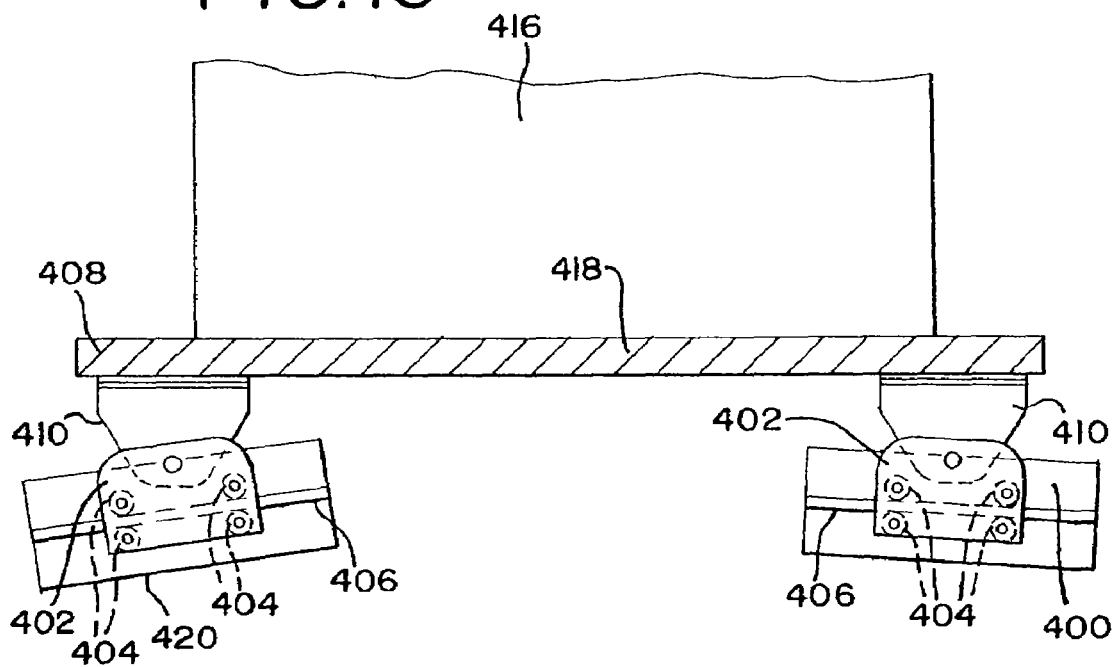
FIG. 16 is a side view of a support mechanism for the monitor support and monitor shown in FIG. 14.

Referring to the embodiments of FIGS. 14-17, a plurality of tracks 400, 420 are secured to a base. In one embodiment, a first pair of laterally spaced tracks 400 are positioned forwardly of a second pair of laterally spaced tracks 420. A plurality of guides 402, or carriages, are moveably connected to the tracks and are translatable therealong. The guides 402 can include opposing pairs of rollers 404, which engage a rib 406 as shown in FIG. 16, or can simply slide along the track. Of course, it should be understood that the track could be any surface with the guide (with or without rollers) sliding or rolling therealong.

Figure 17:
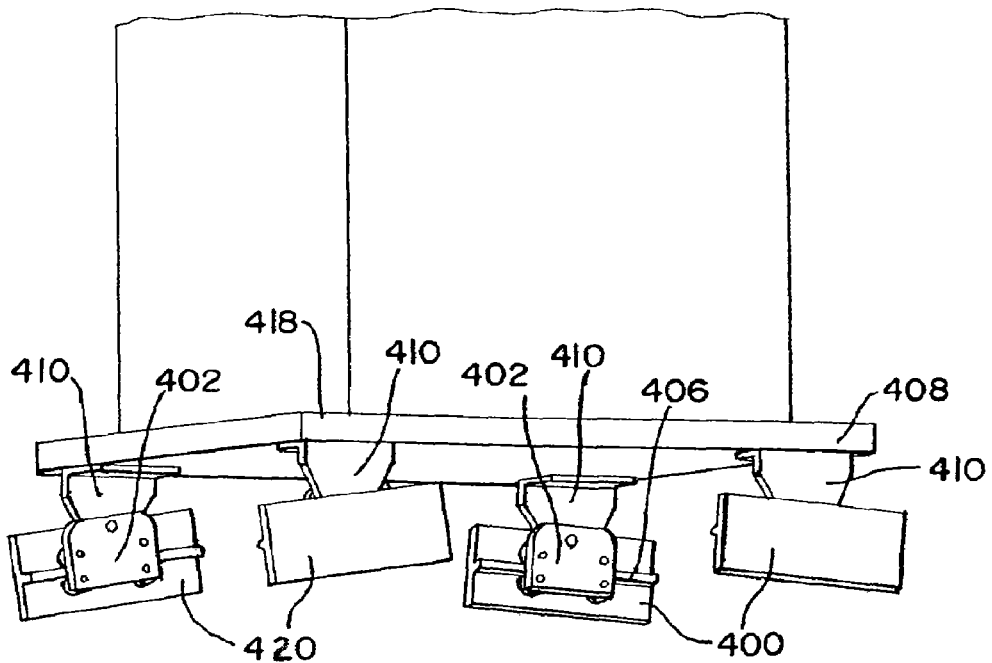
FIG. 17 is a bottom perspective view of the support mechanism, monitor support and monitor shown in FIG. 16.

As shown in FIGS. 16 and 17, each of the second pair of tracks 420 are directed upwardly from a rear to a front thereof while the first pair of tracks 400 are directed downwardly from a rear to a front thereof. In this way, at least one of the tracks 400, 420 is non-parallel to the plane defined by the support surface of the monitor support. In various embodiments, one or more of the tracks may oriented parallel to the plane. In one embodiment, shown in FIGS. 14, 16 and 17, the rear tracks 420 are angled upwardly about 8½ degrees, while the front tracks 400 are angled downwardly about 3½ degrees. In another embodiment, shown in FIG. 15, the rear tracks are substantially horizontal, while the front tracks are angled downwardly about 12 degrees.

The monitor support 408 includes a plurality of brackets 410, shown as L-shaped brackets, that are pivotally connected to corresponding ones of the guides 402, for example with pivot pins. In this way, and with reference to FIGS. 14 and 15, as the monitor support 408 is moved forwardly, the monitor support and monitor 416 supported thereon are rotated about a horizontal axis, with the monitor both rotating and translating as the guides move along the tracks.

As shown in FIGS. 14 and 15, a worksurface 412, shown as a keyboard support or tray, is mounted to a front portion of the monitor support 408 with one or more arms 414. The worksurface 412 is translated and rotated with the monitor support 408. In one preferred embodiment, the distance from the monitor face to the center of the worksurface (or keyboard situated thereon) is approximately 12 inches when the worksurface is in a home position. In addition, in one embodiment, a top support surface 418 of the monitor support is approximately 29 inches above the ground, with a ±4.5 to 4.6 inch adjustment range, while the worksurface is approximately 27.5 inches above the ground, with a ±3.5 to 3.6 inch adjustment range. The worksurface can also be moved up to about 6.5 inches from the home position.

In this way, it should be understood that the worksurface 412 is independently moveable relative to the monitor support 408, for example by way of a pivot and slide, and can be moved horizontally and vertically, and/or rotated, relative thereto. However, once a desired setting or relative positioning between the worksurface 412 and monitor support 408 is achieved, the worksurface and monitor support can be moved synchronously as explained herein. In one embodiment, one or more braking devices are coupled respectively to the worksurface and monitor support to hold the worksurface and monitor support in a desired position. In one embodiment, the worksurface and monitor support can be held at any position within the range of motion of the respective components, thereby providing the worksurface and monitor support with infinite adjustment within those ranges.

In one embodiment, the monitor support is 21 inches long by 21 inches wide, while the monitor has a maximum size of 20 inches long by 20 inches wide by 20 inches tall and a maximum weight of 75 lbs. In one embodiment, the worksurface has a minimum width of 24 inches, and preferably a width of about 30 inches, a depth of about 14 inches, a 1½ inch thickness and an upper recess having a ¾ inch depth, with a 2 inch front lip positioned forwardly of the recess. Of course, other dimensions and sizes would also work.

With reference to FIG. 14, the tracks 400, 420 are oriented such that the front of the monitor support 408, the monitor 416 supported thereon, and the center of gravity of the monitor, do not move a substantial amount in the vertical direction during the forward movement of the monitor support. Accordingly, and assuming a 75 lb monitor, the user force required to move the monitor having a center of gravity positioned from between about ½ and about 11 inches from the front of the monitor support is ±4 lbs.

As the monitor 416 is moved in the horizontal direction, the monitor support 408 and monitor 416 are rotated such that the rear thereof is raised a small amount. For example, in one embodiment, the top front corner 422 of the monitor is moved approximately six (6) inches in a horizontal direction (Mhd), with the monitor being rotated through an angle ($\alpha 1$) approximately 3° in a clockwise direction when viewing the monitor from the right side. Likewise, the worksurface is rotated through an angle ($\beta 1$) approximately 3° in a clockwise direction when viewing the worksurface from the right side. Because of the rotation, however, the front edge 424 of the worksurface 412 is moved only about 4.82 inches in a horizontal direction (WShd), with a movement of approximately 1.24 inches in the vertical direction (WSvd). Accordingly, the monitor support is moved a greater distance in the horizontal direction than the worksurface.

In one preferred embodiment, the monitor and/or monitor support move in the horizontal direction (Mhd) about 6 inches, the worksurface moves in the horizontal direction (WShd) about 5 inches, the monitor and/or monitor support move in the vertical direction (Mvd about 1.5 inches, the worksurface moves in the vertical direction (WSvd) about 1.25 inches, the monitor, monitor support and worksurface rotate through an angle ($\alpha 1$), ($\beta 1$) of about 3 degrees and the distance between the monitor face and the center of the worksurface is about 12 inches.

With reference to FIG. 15, the tracks 400, 420 are oriented such that the corner 422 of the monitor supported thereon, moves in a vertical direction (Mvd) approximately 1.050 inches and moves in a horizontal direction (Mhd) approximately six (6) inches, with the monitor and worksurface again being rotated through angles ($\alpha 1$, $\beta 1$) approximately 3° in a clockwise direction when viewing the monitor and worksurface from the right side. The location of the center of gravity 426 of the monitor is moved approximately 0.722 inches in the vertical direction over a six inch horizontal movement. Accordingly, the user force required to move the monitor (assuming 75 lbs) having a center of gravity positioned from between ½ inch and 11 inches from the front of the monitor support is −7 to +15 pounds. Because of the rotation, the front edge 424 of the worksurface is moved about 4.8 inches in a horizontal direction (WShd), with a movement of approximately 2.0 inches in the vertical direction (WSvd). Accordingly, the worksurface again moves a lesser distance in the horizontal direction than the monitor and the monitor support.

Figure 20:
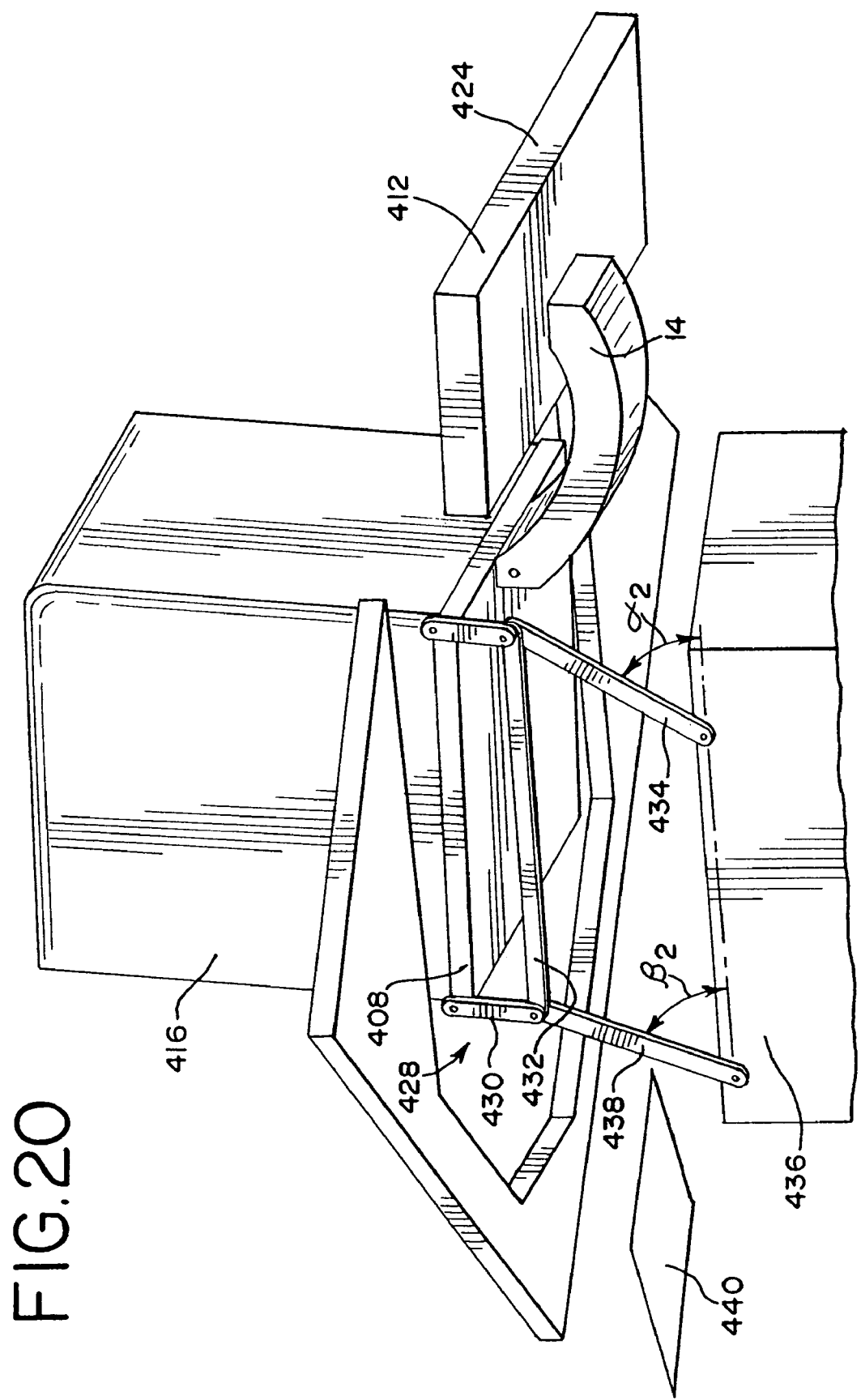
FIG. 20 is a bottom perspective view of the workstation shown in FIG. 18.

Referring to FIGS. 18-20, the monitor support 408 is supported by a pair of four bar linkages 428, with the monitor support 408 defining one bar, a base 436 defining a second bar, and a pair of links 434, 438 connecting the first and second bars and defining the third and fourth bars respectively. In one embodiment, the monitor support includes a pair of legs 430 and a cross member 432 secured to the ends of the links 434, 438 and defining the first bar. It should be understood that the links 434, 438 can be directly connected to the monitor support.

In one embodiment, shown in FIGS. 18 and 20, the links 434, 438 are not parallel to each other. Rather, the forward link 434 has a lesser angle ($\alpha 2$) relative to a horizontal plane 440 than does an angle ($\beta 2$) of the rear link. In one exemplary embodiment, the angle ($\alpha 2$) is approximately 58.9° while the angle ($\beta 2$) is about 71.0 degrees when the monitor support is in a forward position. In one embodiment, the rear link 438 is about 10 inches long. Alternatively, as shown in FIG. 19, the links 434, 438 are parallel such that the four bar linkage forms a parallelogram.

Referring to the embodiment of FIGS. 18 and 20, as the four bar linkages 428 are rotated, the monitor support 408 and monitor 416 supported thereon are rotated about a horizontal axis, with the monitor 412 and monitor support 408 both rotating and translating as the linkage rotates. Therefore, as the monitor 416 is moved in the horizontal direction, the monitor support 408 and monitor 416 are rotated. For example, in one embodiment, the top corner 422 of the monitor is moved approximately six (6) inches in a horizontal direction, with the monitor being rotated approximately 3° in a clockwise direction when viewing the monitor from the right side. In addition, the top corner 422 of the monitor moves in the vertical direction approximately 1.50 inches, with the center of gravity 426 moving approximately 1.15 inches. Because of the rotation, however, the front edge 424 of the worksurface 412 is moved only about 4.9 inches in a horizontal direction, with a movement of approximately 2.5 inches in the vertical direction. The user force required to move the monitor (assuming 75 lbs) having a center of gravity positioned from between ½ inch and 11 inches from the front of the monitor support is −7 to +45 pounds, which may require a counterbalance mechanism, such a spring.

With reference to FIG. 19, the monitor support 408 and monitor 416 are not rotated due to the parallelogram configuration of the linkage assembly. Instead, the monitor 416, monitor support 408 and worksurface 412 are only translated in horizontal and vertical directions. In particular, the components are moved approximately 6.05 inches in a horizontal direction, with a vertical movement of approximately 1.87 inches. Accordingly, in this embodiment, the worksurface 412 moves the same horizontal distance as the monitor support 408, not a lesser amount. The user force required to move the monitor (assuming 75 lbs) having a center of gravity positioned from between ½ inch and 11 inches from the front of the monitor support is 0 to +49 pounds, which is independent of the location of the center of gravity. Again, a counterbalance may be required.

Figure 11:
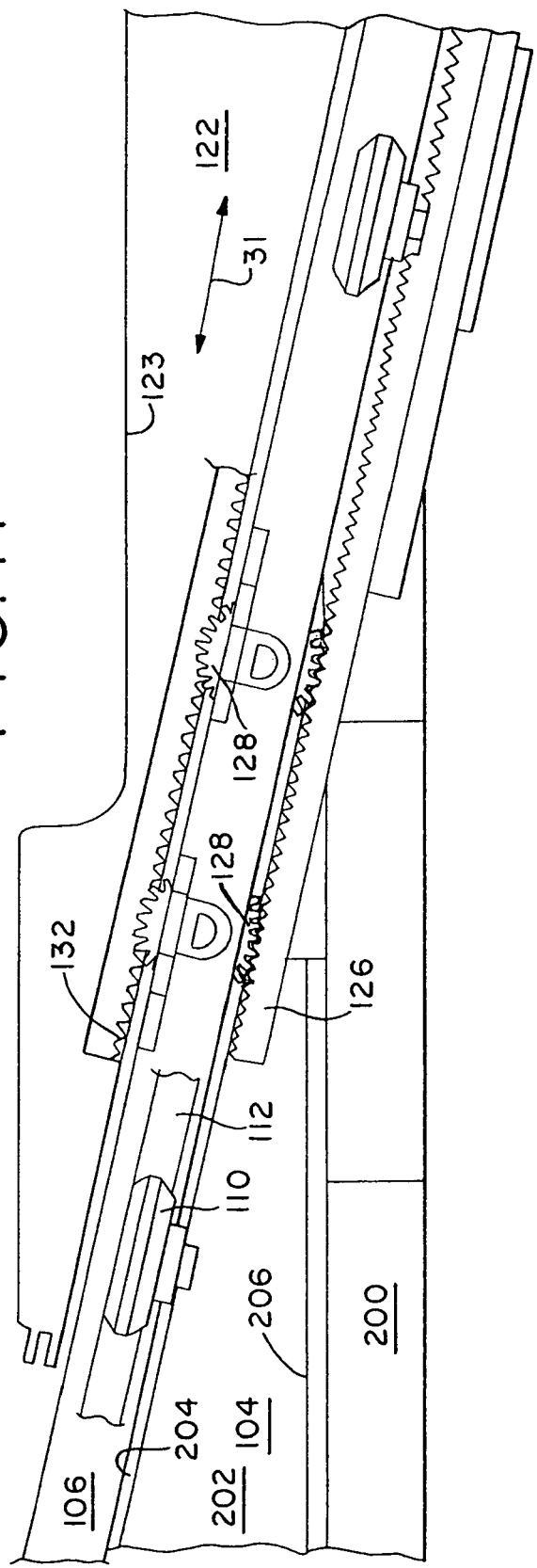
FIG. 11 is a cross-sectional view of a portion of the workstation shown in FIG. 9.

Referring to FIGS. 9-11, the base 104 includes a worksurface member 200 and a support member 202 secured to the worksurface member 200. The support member has an upper surface 204 that forms an angle with a horizontal plane, which is defined in this embodiment by the surface of the worksurface member 206. Preferably, the upper surface 204 is angled between about 5 degrees and about 45 degrees relative to the horizontal plane, and in one embodiment at about 15 degrees from the horizontal plane. The worksurface 106 is translatably mounted on the support member 202, as described above. Accordingly, the worksurface 106, and in particular the upper surface of the worksurface 106 that the monitor support is supported on, is also positioned at an angle relative to the horizontal plane. In this way, the worksurface 106 and the monitor support 122 both move downwardly as they move forwardly. In one embodiment, the change in vertical height relative to the change in horizontal depth is at about a 1:3 ratio. This movement further accommodates and mimics the movement of the user.

The monitor support 122 includes one or more upper support surfaces 123 that supports the monitor. In one embodiment, the upper surface 123 is maintained in a substantially horizontal plane, and forms an angle relative to the bottom of the monitor support that is substantially the same as the angle of the worksurface relative to the horizontal plane. In this way, the monitor is maintained on a horizontal plane even as it moves downwardly and forwardly. In other embodiments, the upper support surface is also formed at an angle, with the monitor support being configured with a catch, latch, friction or bonding device to prevent the monitor from sliding off of the support surface.

The ability of the monitor support 22 to move at a greater rate and to a greater distance than the worksurface 6 can be important for users sitting in a tilting chair. In particular, the hands of a user typically travel about half (½) the distance of the head of the user when the user tilts rearwardly in the chair. Accordingly, the workstation 2 maintains a substantially constant and ideal distance between the user's eyes and the monitor 38 supported on the monitor support 22, regardless of the tilt position of the user, as the worksurface 6 is moved to accommodate the position of the hands of the user.

Referring to FIGS. 4-6, the monitor support 22 has a pivotable platform 50 on which the monitor is supported. The platform has a front tip 59, which engages the base of a monitor supported on the platform. The platform 50 has a pair of pivot pins 52 that are received in a pair of guides 54 formed in sidewalls 56 of a monitor support base 58. A pivot gear 60 is rotatably mounted to the platform 50 and engages a linear gear 62 translatably mounted to the monitor support base 58. An actuator 64, such as spring or cable, is coupled to the linear gear 62. In operation, the actuator 64, which can be mounted to the front of the worksurface adjacent the user, is operated to move the linear gear 62 in a fore-aft direction, thereby rotating the pivot gear 60 and platform 50 relative to the monitor support base 58. In this way, the angle of the monitor can be easily adjusted by the user, which further allows the user to maintain the same position and orientation of the monitor relative to their eyes. It should be understood that the pivot gear can be mounted on the base and the linear gear mounted on the platform. In addition, it should be understood that other devices, for example other gear configurations including various rotary gear components and various friction or clutch devices, can be interfaced between the platform and base to control the pivoting of the platform.

In another aspect, the side walls 56 of the monitor support base 58 are provided with several sets of guides 54, such that the monitor platform 50 can be initially set at different discrete height levels relative to the monitor support base 58 and moveable worksurface 6, thereby providing an additional gross height adjustment capability.

Referring to FIGS. 1, 2, 4 and 7, the worksurface 6 includes a primary worksurface component 68 and an auxiliary component 70, configured in one embodiment as a pivotable keyboard tray. The auxiliary component 70 is rotatably mounted to a front portion of the primary worksurface component 68 about a rotation axis 72. In one embodiment, the auxiliary component 70 is provided with a pivot gear 74 rotatable about rotation axis 72. A gear jam 76 is moveably mounted, for example by translation or rotation/pivoting, to the primary component 68. An actuator 80 such as a cable, lever pull or spring, or combinations thereof, is accessible to the user and is mounted to the worksurface component 68. The actuator 80, is connected to the gear jam 76. The user actuates the actuator 80 to move the gear jam 76. The gear jam 76 is moveable between an engaged position, wherein the gear jam 76 engages the pivot gear 74 and thereby immobilizes the auxiliary component, and a disengaged position, wherein the auxiliary component can be pivoted or rotated to a desired position. In this way, the user can maintain the same angle between their hands and a keyboard positioned on the auxiliary component regardless of the tilt position of the user. It should be understood that other devices, including various gear configurations and friction or clutch devices, can be interfaced between the primary and auxiliary components to control and/or limit the pivoting of the auxiliary component.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A computer workstation comprising:
   a base;
   a worksurface supported by said base and comprising a front leading edge moveable a first distance in a fore-and-aft direction between first and second worksurface positions, wherein said front leading edge is cantilevered forwardly in said second worksurface position such that at least a center portion of said front leading edge does not overlie said base when said worksurface is in said second worksurface position;
   a monitor support coupled to said worksurface, wherein at least one of said worksurface and said monitor support is automatically moveable in response to a movement of the other of said worksurface and said monitor support, wherein said monitor support is automatically moveable a second distance in said fore-and-aft direction between first and second monitor positions in response to said front leading edge of said worksurface being moved said first distance between said first and second worksurface positions, wherein said second distance is greater than said first distance, and wherein said monitor support is positioned rearwardly of said front leading edge of said worksurface as said front leading edge of said worksurface is moved between said first and second worksurface positions, and wherein said monitor support does not overlie said front leading edge of said worksurface as said monitor support is moved between said first and second monitor positions.

2. The computer workstation of claim 1 further comprising support rollers interfacing between said worksurface and said base.

3. The computer workstation of claim 2 further comprising a track formed on one of said worksurface and said base and at least one guide roller coupled to the other of said worksurface and said base, wherein said at least one guide roller engages said track.

4. The computer workstation of claim 1 wherein said base comprises a first gear, said monitor support comprises a second gear and said worksurface comprises a pinion gear rotatably mounted thereto, wherein said pinion gear engages said first and second gears.

5. The computer workstation of claim 4 wherein said first and second gears comprise first and second racks respectively, wherein said first and second racks face each other.

6. The computer workstation of claim 4 further comprising a motor operably connected to said pinion gear.

7. The computer workstation of claim 1 wherein said monitor support is supported by said worksurface.

8. The computer workstation of claim 7 further comprising support rollers interfacing between said monitor support and said worksurface.

9. The computer workstation of claim 7 wherein said monitor support is slidably supported by said worksurface.

10. The computer workstation of claim 1 wherein said monitor support comprises a base and a platform pivotally mounted to said base.

11. The computer workstation of claim 1 wherein said second distance is between about 1.5 and 3.0 times said first distance.

12. The computer workstation of claim 11 wherein said second distance is about 2.0 times said first distance.

13. The computer workstation of claim 1 further comprising a keyboard tray pivotally mounted to said worksurface.

14. The computer workstation of claim 1 wherein said worksurface is connected to a first drive device and said monitor support is connected to a second drive device, and wherein said monitor support and said worksurface are coupled with a controller operably connected to said first and second drive devices.

15. The computer workstation of claim 14 wherein said first and second drive devices comprise first and second motors respectively.

16. The computer workstation of claim 1 wherein a support surface of said worksurface forms an angle with a horizontal plane.

17. The computer workstation of claim 16 wherein said angle is between about 5 degrees and about 45 degrees.

18. A computer workstation comprising:
a worksurface moveable a first distance in a fore-and-aft direction between first and second worksurface positions, wherein a support surface of said worksurface forms an angle between about 5 and 45 degrees with a horizontal plane;
a monitor support coupled to said worksurface, wherein at least one of said worksurface and said monitor support is automatically moveable in response to a movement of the other of said worksurface and said monitor support, wherein said monitor support is automatically moveable a second distance in said fore-and-aft direction between first and second monitor positions in response to said worksurface being moved said first distance between said first and second worksurface positions, wherein said second distance is greater than said first distance; and
a base having an upper surface formed at substantially said angle with said horizontal plane, wherein said base supports said worksurface on said upper surface.

19. A computer workstation comprising:
a worksurface moveable a first distance in a fore-and-aft direction between first and second worksurface positions;
a monitor support coupled to said worksurface, wherein at least one of said worksurface and said monitor support is automatically moveable in response to a movement of the other of said worksurface and said monitor support, wherein said monitor support is automatically moveable a second distance in said fore-and-aft direction between first and second monitor positions in response to said worksurface being moved said first distance between said first and second worksurface positions, wherein said second distance is greater than said first distance, and wherein said monitor support is supported by a four bar linkage.

20. The computer workstation of claim 19 wherein said four bar linkage is configured as a parallelogram.

21. The computer workstation of claim 19 wherein said monitor support is pivotally supported by a pair of non-parallel links.

22. The computer workstation of claim 19 wherein said worksurface is connected to a front of said monitor support.

* * * * *